United States Patent
Oh

(10) Patent No.: US 7,506,845 B2
(45) Date of Patent: Mar. 24, 2009

(54) STOCK BAR AND HORIZONTAL BAR COUPLING DEVICE FOR MOUNTING SPRINKLER

(75) Inventor: Seung-il Oh, Seoul (KR)

(73) Assignee: Kofulso Co., Ltd, Icheon-si (KR)

( * ) Notice: Subject to any disclaimer, the term of this patent is extended or adjusted under 35 U.S.C. 154(b) by 0 days.

(21) Appl. No.: 11/543,206

(22) Filed: Oct. 5, 2006

(65) Prior Publication Data

US 2008/0083853 A1 Apr. 10, 2008

(51) Int. Cl.
*F16L 3/00* (2006.01)
(52) U.S. Cl. ............................. 248/73; 248/72; 248/75
(58) Field of Classification Search .................. 248/73, 248/75, 62, 65, 343, 72; 52/506.07, 715; 169/16, 17, 37, 41
See application file for complete search history.

(56) References Cited

U.S. PATENT DOCUMENTS

| | | | |
|---|---|---|---|
| 2,375,513 A | 5/1945 | Bach | 248/72 |
| 2,962,252 A * | 11/1960 | Frank | 248/231.81 |
| 3,341,909 A | 9/1967 | Havener | 248/72 |
| 3,556,452 A | 1/1971 | Ramsey | 248/343 |
| 3,558,091 A | 1/1971 | Bush | |
| 3,608,857 A | 9/1971 | Hibbeler | 248/317 |
| 3,612,461 A | 10/1971 | Brown | 248/317 |
| 3,652,780 A | 3/1972 | Wilson | 248/72 |
| 3,874,035 A | 4/1975 | Schulpin | 248/72 |
| 4,135,692 A | 1/1979 | Ferguson | 248/317 |
| 4,408,428 A | 10/1983 | Brooke et al. | |
| 4,544,119 A | 10/1985 | Kellett et al. | |
| 4,717,099 A | 1/1988 | Hubbard | 248/57 |
| 4,723,749 A | 2/1988 | Carraro et al. | 248/317 |
| 5,595,363 A | 1/1997 | DeLeebeeck | 248/72 |
| 5,667,181 A | 9/1997 | Van Leeuwen et al. | 248/343 |
| 6,260,810 B1 | 7/2001 | Choi | 248/65 |
| 6,345,800 B1 | 2/2002 | Herst et al. | 248/342 |

* cited by examiner

*Primary Examiner*—Korie H. Chan
(74) *Attorney, Agent, or Firm*—Jacobson Holman PLLC

(57) ABSTRACT

A stock bar and horizontal bar coupling device for mounting a sprinkler, which can be used regardless of the type of horizontal bar. The stock bar and horizontal bar coupling device includes a main body. A mounting part is provided on the upper portion of the main body and has an inlet for fitting a stock bar into the mounting part. A fastening member is vertically fastened to the upper portion of the mounting part to fasten the stock bar. A fitting part is provided on a lower portion of the main body so that a locking step of a T-shaped bar is fitted into the fitting part. A screw hole is formed in a front surface of the fitting part, so that a fastening member is inserted into the screw hole to fasten the T-shaped bar. In this case, the main body is cut at a middle portion of a front thereof, and a cut portion is bent, thus providing a coupling part to be coupled to a locking step of an M-shaped bar.

1 Claim, 10 Drawing Sheets

STOCK BAR AND HORIZONTAL BAR COUPLING DEVICE FOR MOUNTING SPRINKLER

BACKGROUND OF THE INVENTION

1. Field of the Invention

The present invention relates generally to a stock bar and horizontal bar coupling device for mounting a sprinkler, and, more particularly, to a coupling device which can be applied to various types of horizontal bars.

2. Description of the Related Art

Generally, horizontal bars, which are coupled to a stock bar to cross the stock bar, are typically classified into a horizontal bar having the cross section of an inverted T shape, and a horizontal bar having the cross section of a U shape. According to the type of horizontal bar, a device for coupling the stock bar to the horizontal bar is manufactured to have the structure corresponding to the horizontal bar.

FIG. 1 is a view illustrating a coupling device, in which each of horizontal bars B comprises a T-bar having the cross section of an inverted T shape. As shown in the drawing, a coupling unit A for coupling each horizontal bar B with a stock bar C has on the upper portion thereof a fitting part A-1 which is open at one side thereof such that the fitting part A-1 can be perpendicularly fitted over the stock bar C. The stock bar C fitted into the fitting part A-1 is fastened via a fastening member A-2. The lower portions of side walls A-4 of the coupling unit A are closed by the tightening force of fastening members A-3, so that locking ends A-5 of the coupling unit A engage with locking steps B-1 of each horizontal bar B which is horizontally installed.

FIG. 2 is a view illustrating a coupling device, in which each of horizontal bars D comprises an M-bar having a U-shaped cross section. As shown in the drawing, a coupling unit E for coupling each horizontal bar D with a stock bar C has on lower portions of both sidewalls E-1 fitting parts E-2 such that an upper wing D-1 of each horizontal bar D is fitted into the fitting parts E-2. A notch E-3 is formed on each fitting part E-2 such that a bent part D-2 of each horizontal bar D is fitted into the notch E-3. Further, a fastening member E-5 is provided on the upper surface E-4 of the coupling unit E. When the fastening member E-5 is tightened, the stock bar C fitted between the two sidewalls E-1 is in close contact with the upper wing D-1.

The conventional coupling units A and E are problematic in that different structures are required for different types of horizontal bar, so that one of the coupling units A and E must be selected according to the type of horizontal bar. Thus, unless the coupling unit suitable for the type of horizontal bar is determined before installation work commences, the working period may increase. Further, a material supplier must provide two kinds of coupling units, thus inconveniencing the material supplier.

SUMMARY OF THE INVENTION

Accordingly, the present invention has been made keeping in mind the above problems occurring in the prior art, and an object of the present invention is to provide a stock bar and horizontal bar coupling device for mounting a sprinkler, which can be used regardless of the type of horizontal bar.

Another object of the present invention is to provide a stock bar and horizontal bar coupling device for mounting a sprinkler, which can be used to couple a cross bar to a stock bar.

In order to accomplish the above objects, the present invention provides a stock bar and horizontal bar coupling device for mounting a sprinkler, having a main body, a mounting part provided on an upper portion of the main body and having an inlet for fitting a stock bar into the mounting part, a fastening member vertically fastened to an upper portion of the mounting part to fasten the stock bar, a fitting part provided on a lower portion of the main body so that a locking step of a T bar is fitted into the fitting part, and a first screw hole formed in a front surface of the fitting part, so that a fastening member is inserted into the screw hole to fasten the T bar, wherein the main body is cut at a middle portion of a front thereof, and a cut portion is bent, thus providing a coupling part to be coupled to a locking step of an M bar.

Further, the present invention provides a stock bar and horizontal bar coupling device for mounting a sprinkler, in which a second screw hole is formed under the screw hole, so that the fastening member is fastened to the second screw hole, thus coupling a cross bar to the stock bar.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the preferred embodiments of the present invention will be described in detail with reference to the accompanying drawings.

Figure 1:
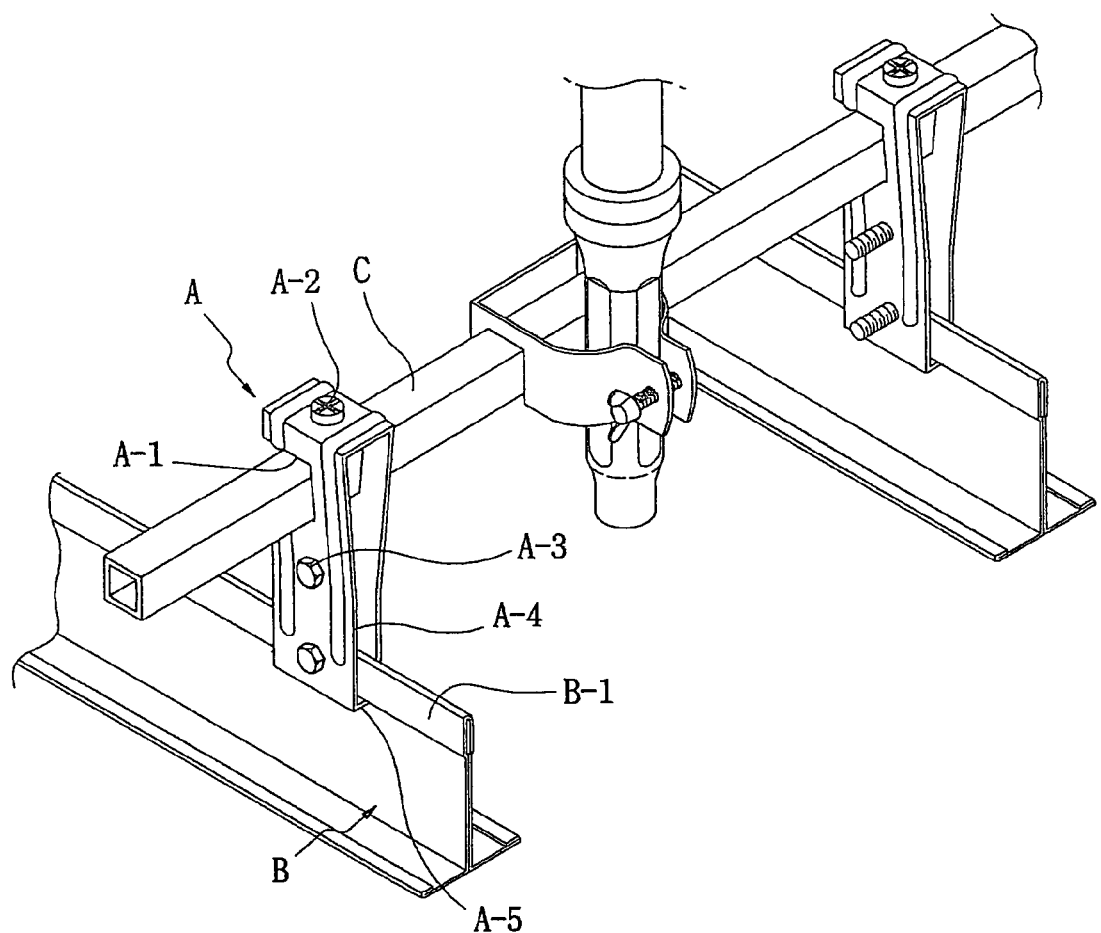
FIG. 1 is a view showing a conventional stock bar and T-bar coupling device, in which a T-bar is used as a horizontal bar.
Figure 2:
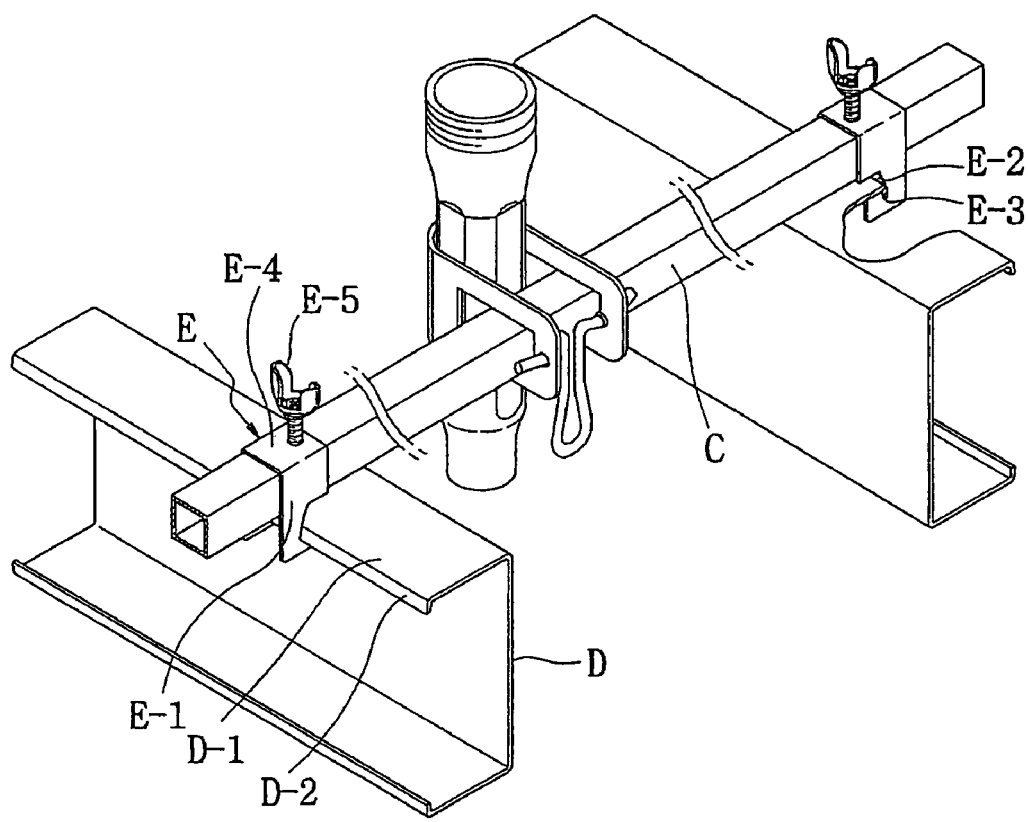
FIG. 2 is a view showing a conventional stock bar and M-bar coupling device, when an M-bar is used as a horizontal bar.
Figure 3:
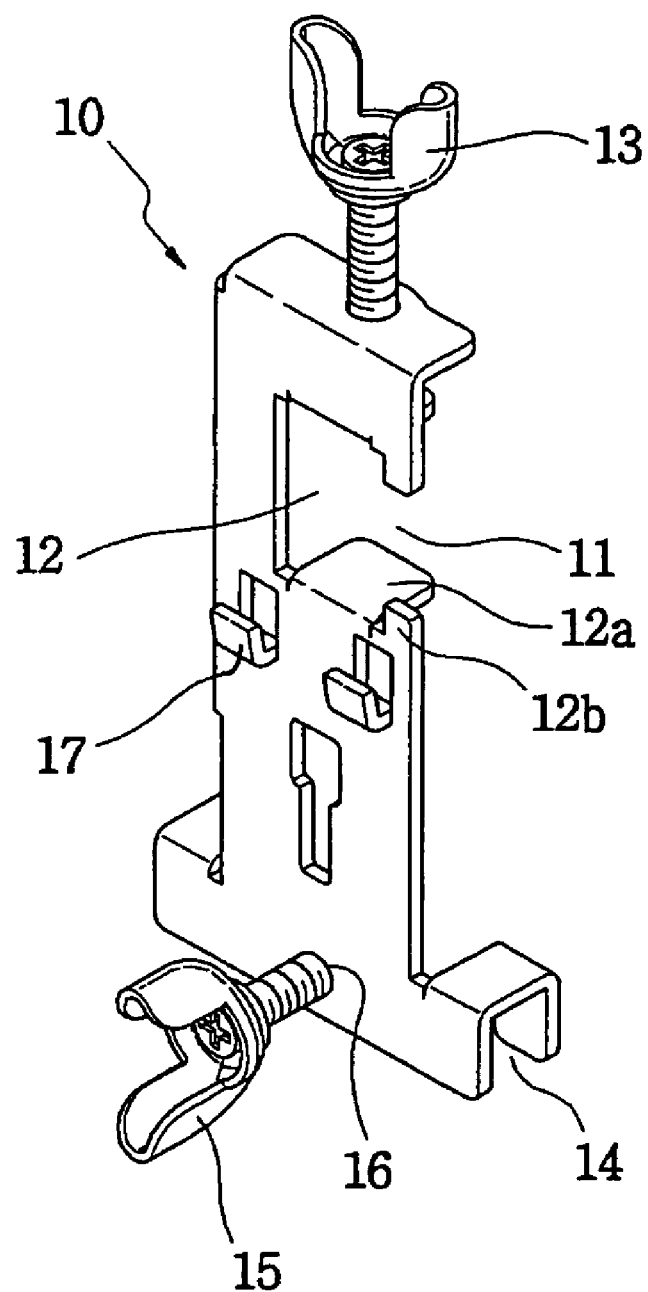
FIG. 3 is a perspective view showing a coupling device, according to an embodiment of the present invention.
Figure 4:
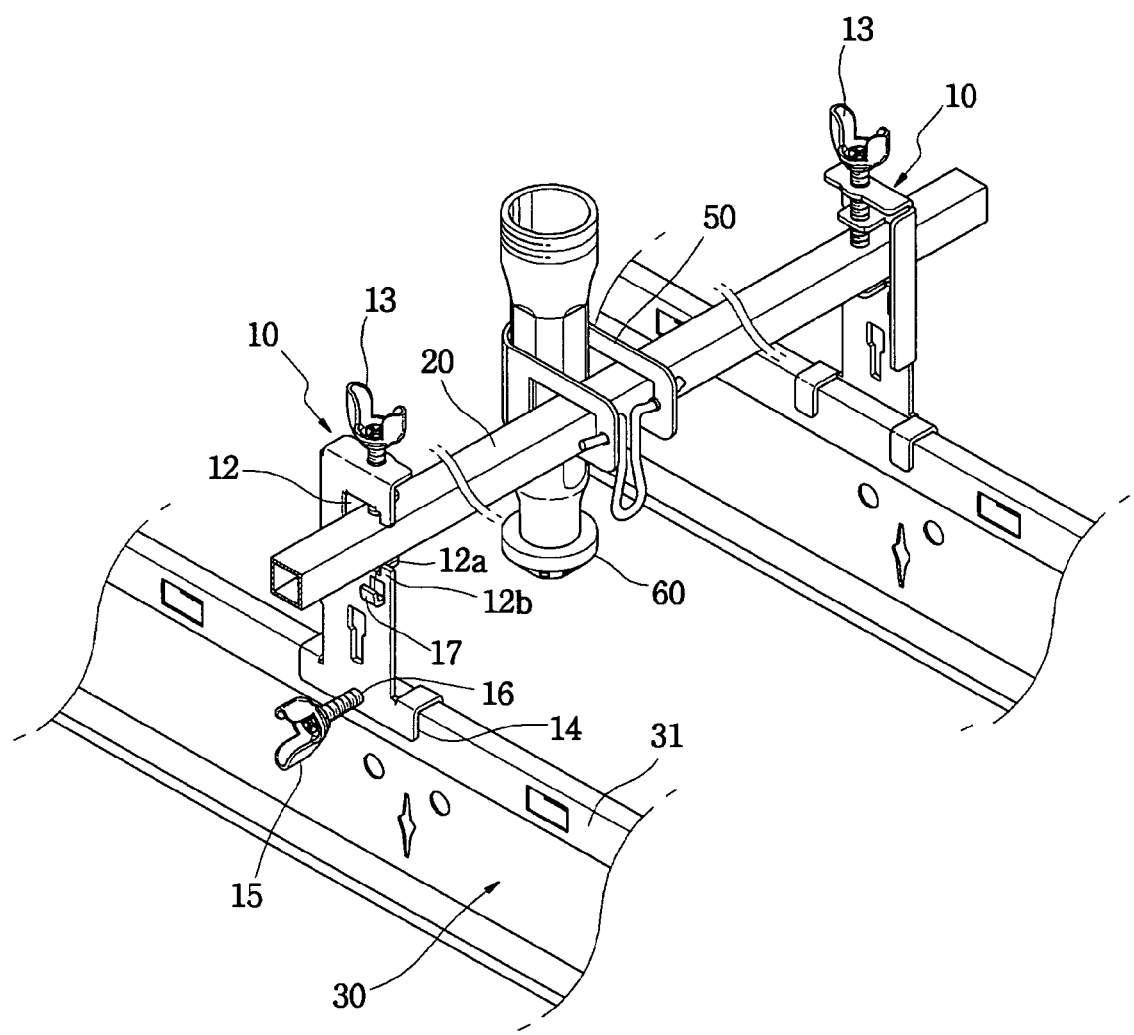
FIG. 4 is a perspective view showing the coupling state, according to the present invention, in which a T-bar is used as a horizontal bar.
Figure 5:
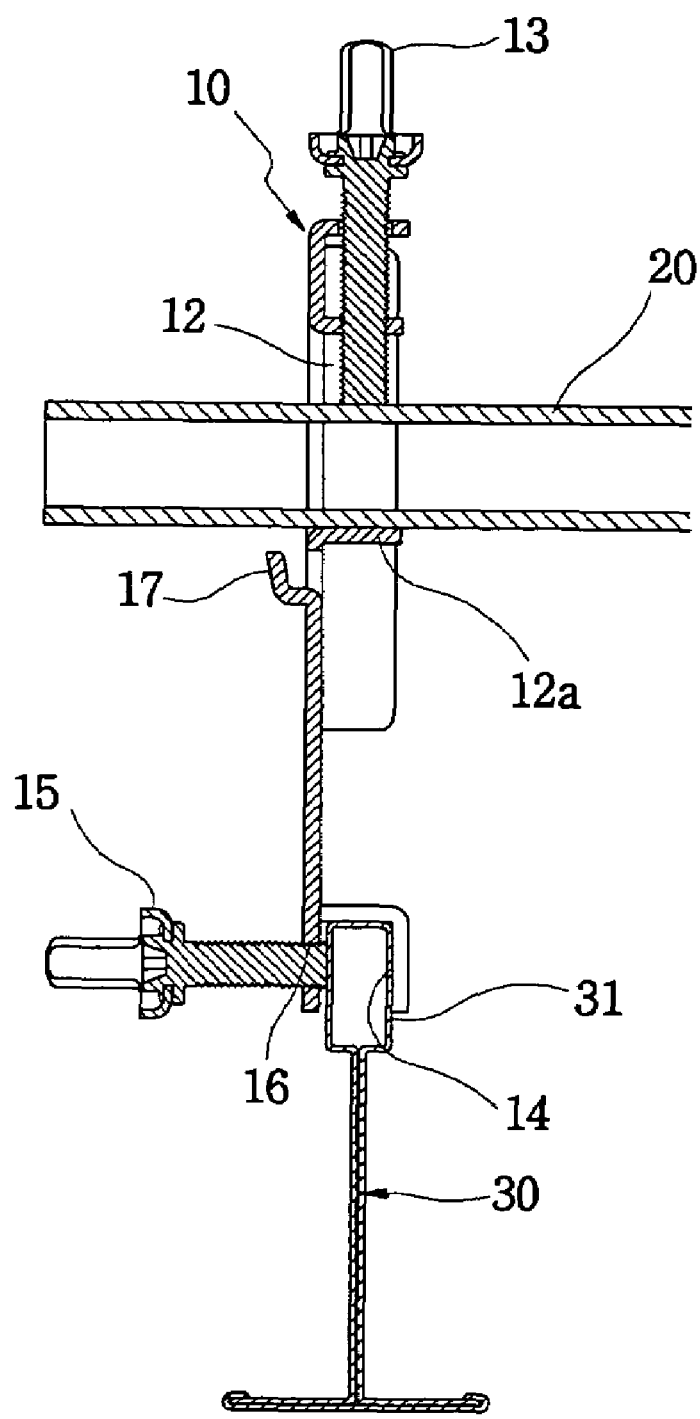
FIG. 5 is a sectional view taken along line X-X of FIG. 4.
Figure 6:
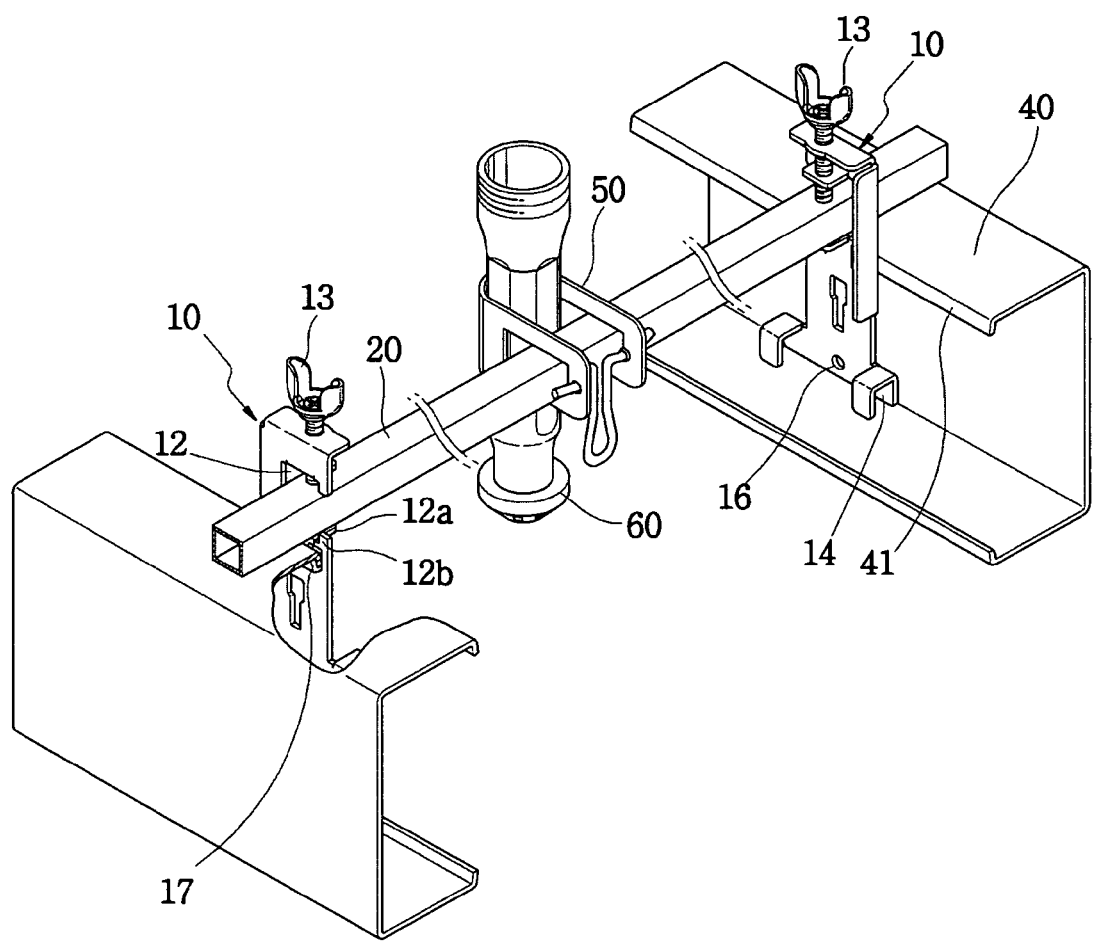
FIG. 6 is a perspective view showing the coupling state, according to the present invention, in which an M-bar is used as a horizontal bar.
Figure 7:
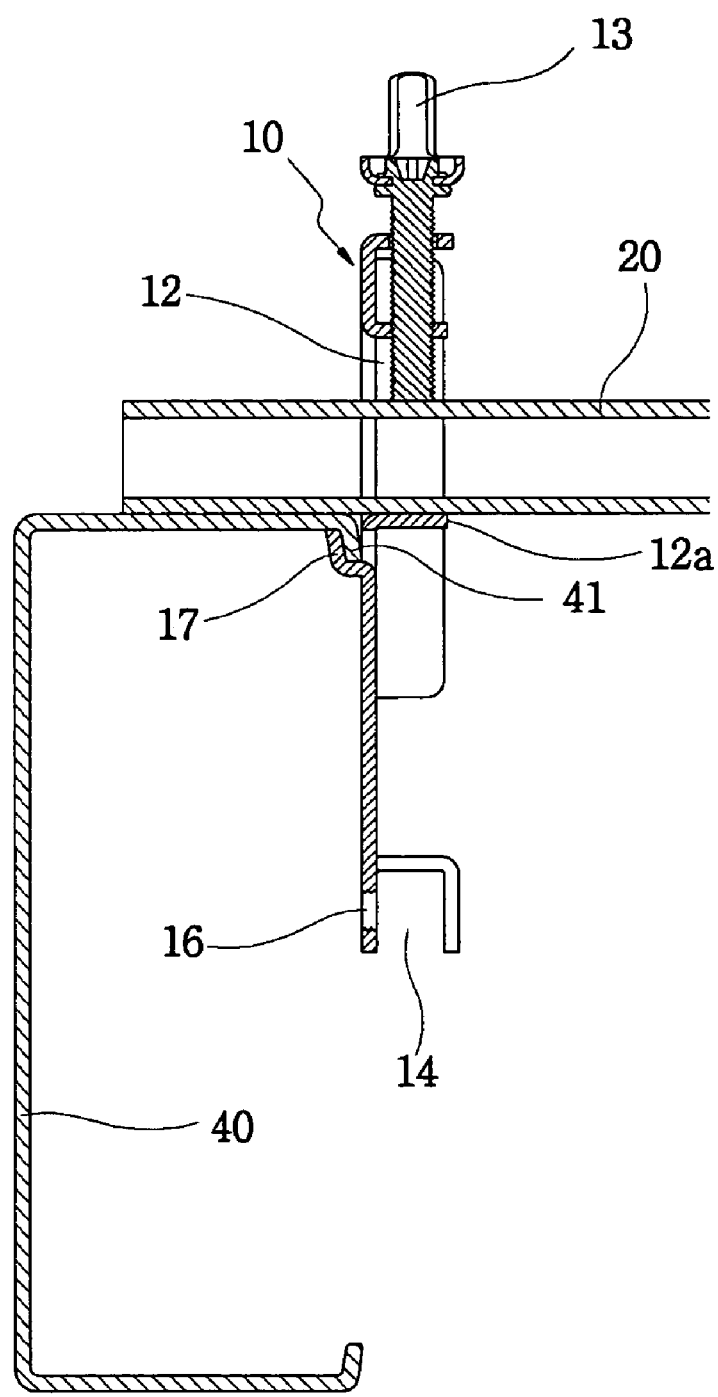
FIG. 7 is a sectional view taken along line Y-Y of FIG. 6.

FIG. 3 is a perspective view showing a stock-bar and horizontal bar coupling device, according to the present invention, FIGS. 4 and 5 are views showing the state where a T-bar is used as a horizontal bar, and FIGS. 6 and 7 are views showing the state where an M-bar is used as the horizontal bar.

As shown in FIGS. 3 to 7, the stock bar and horizontal bar coupling device according to the present invention includes a main body 10. A mounting part 12 is provided on the upper portion of the main body 10, and has an inlet 11 so that a stock bar 20 can be fitted into the mounting part 12. A fastening member 13 is vertically mounted to the upper portion of the mounting part 12, thus fastening the stock bar 20. A fitting part 14 is provided on the lower portion of the main body 10 such that a locking step 31 of a T bar 30 is fitted into the fitting part 14. A screw hole 16 is formed in the front of the fitting part 14, so that a fastening member 15 is inserted into the screw hole 16 to fasten the T bar 30. According to this invention, the middle portion of the front of the main body 10 is cut, and the cut portions are bent, thus providing coupling parts 17 to be coupled to a locking step 41 of an M bar 40.

As shown in FIGS. 4 and 5, each T bar 30 used as the horizontal bar is constructed so that the narrow locking step 31 is exposed to the upper portion. Thus, the locking step 31 is fitted into the fitting part 14. Conversely, as shown in FIGS. 6 and 7, each M bar 40 is higher than the T bar 30, and is constructed so that the locking step 41 is bent downwards. Thus, the locking step 41 cannot be fitted into the coupling part 12.

The stock bar 20 supported by the main body 10 is installed above each horizontal bar and is perpendicular to the horizontal bar. A sprinkler 60 is vertically installed using a snap clamp 50 coupled to the stock bar 20.

A bent part 12*a* is provided on the lower portion of the mounting part 12 to support the bottom of the stock bar 20. A step 12*b* is provided between the inlet 11 and the bent part 12*a*, thus preventing the unexpected removal of the stock bar 20 fastened in the mounting part 12 by the fastening member 13.

In the present invention constructed as described above, when a worker desires to couple the stock bar 20 to the T bars 30, each fitting part 14 is fitted into the locking step 31 of each T bar 30. In such a state, the fastening member 15 is tightened, thus fastening the main body 10. Next, the stock bar 20 is put into the mounting part 12 through the inlet 11, and the fastening member 13 provided at the upper position is tightened. Thereby, the stock bar 20 is installed above the T bars 30 to cross the T bars 30.

Meanwhile, when the M bar 40 is used as the horizontal bar, in place of the T bar 30, the fastening member 15 is removed from the screw hole 16. In such a state, the coupling parts 17 protruding forwards are hooked to the locking step 41 of each M bar 40, and the stock bar 20 is fitted into the mounting part 12 provided in the upper portion of the main body 10 and is fastened by the fastening member 13. Thereby, the stock bar 20 is firmly coupled to the M bar 40.

As such, the coupling device of the present invention can be used both when the T bar 30 is used as the horizontal bar and when the M bar 40 is used as the horizontal bar. Thus, it is unnecessary to select the kind of coupling device beforehand at a preparatory step before installing the sprinkler. Further, a material supplier has only to produce and supply one kind of coupling device for both kinds of horizontal bar, and thus the work of installing the sprinkler can be efficiently carried out.

Figure 8:
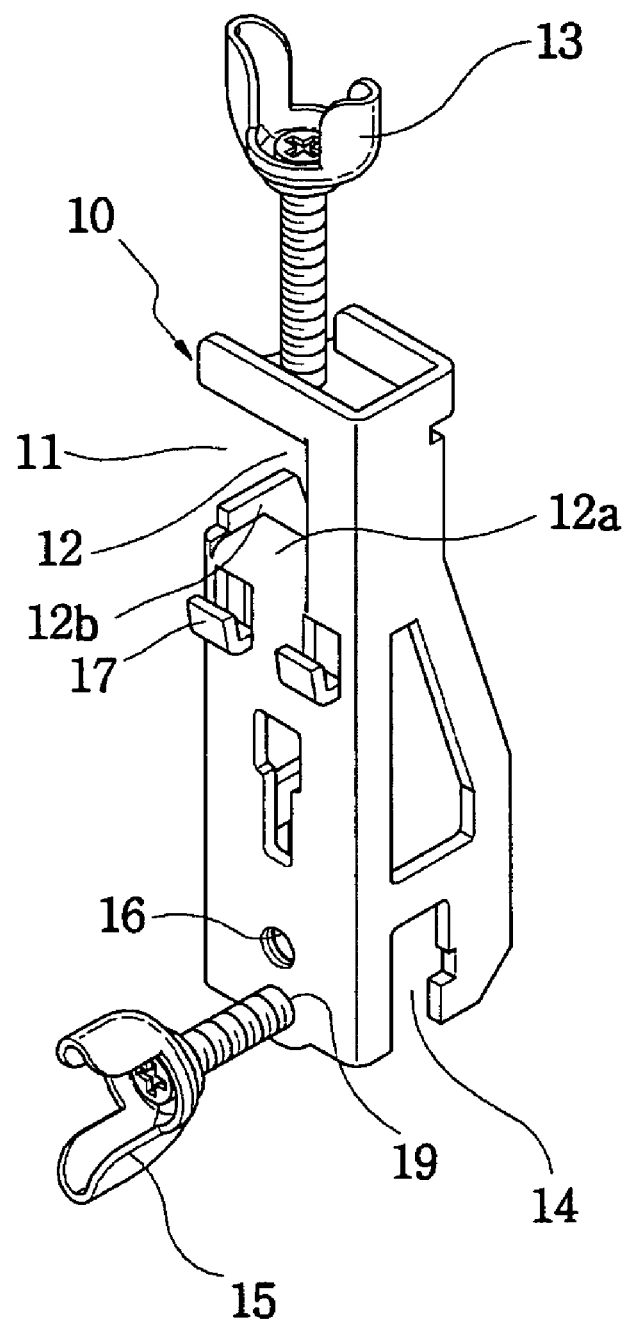
FIG. 8 is a perspective view showing a coupling device, according to another embodiment of the present invention.
Figure 9:
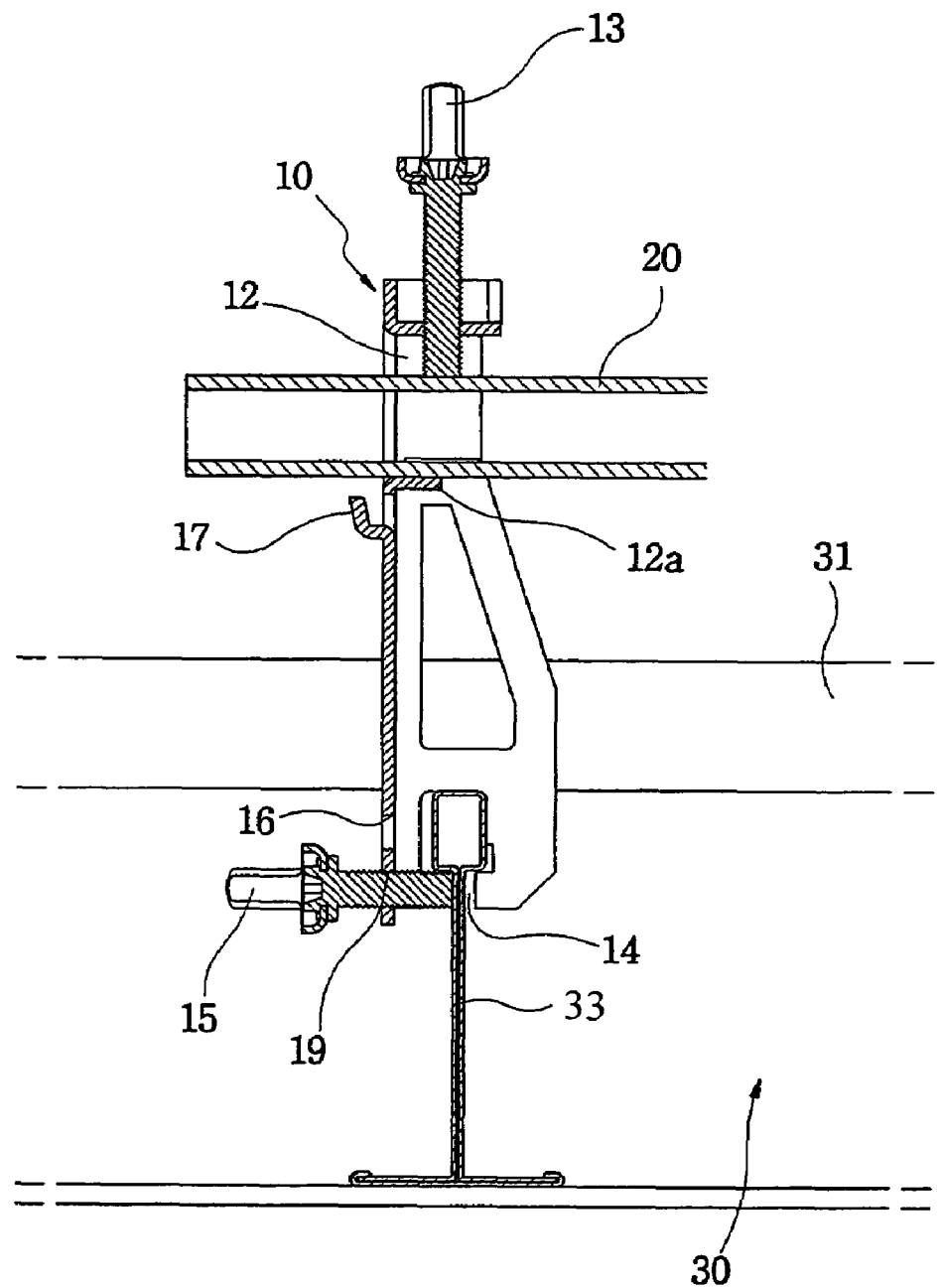
FIG. 9 is a sectional view showing the state where a cross bar is coupled to a stock bar, using the coupling device according to another embodiment of the present invention.

FIGS. 8 and 9 are views showing another embodiment of the present invention.

Figure 10:
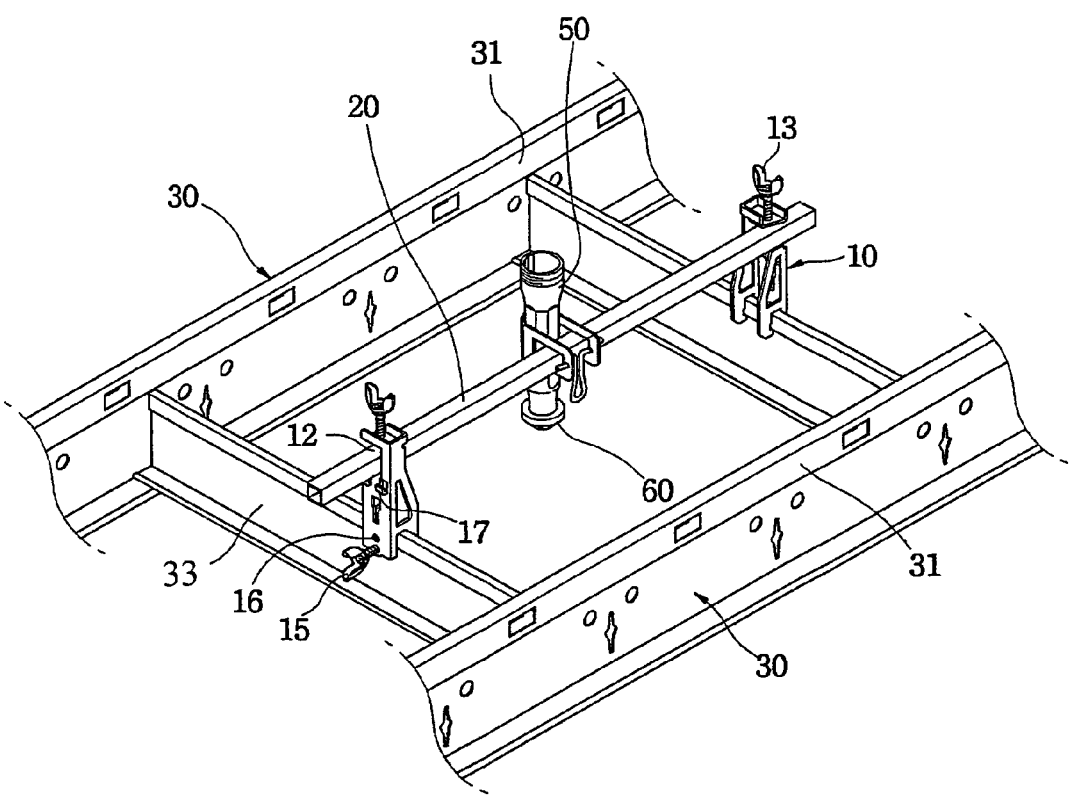
FIG. 10 is a perspective view showing the state where the cross bar is coupled to the stock bar, using the coupling device according to another embodiment of the present invention.

As shown in the drawings, a side part 18 is integrally provided on a main body 10, and a fitting part 14 is provided on the lower portion of the side part 18 such that a T bar 30 can be fitted into the fitting part 14. Such a construction increases the strength of the main body 10. Further, a second screw hole 19 is formed under a screw hole 16, so that a fastening member 15 is selectively tightened to one of the screw holes 16 and 19. When the fastening member 15 is inserted into the second screw hole 19, the coupling device may be used to couple a cross bar 32 to the stock bar 20. As shown in FIG. 10, the cross bar 32 is a member for coupling the T bars 30 to each other.

The fastening member 15 inserted into the screw hole 16 tightens the side of a locking step 31, and the fastening member 15 inserted into the second screw hole 19 tightens the T bar 30 at a position adjacent to the lower end of the locking step 31, thus more firmly preventing the T bar 30 from sagging.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stock bar and horizontal bar coupling device for mounting a sprinkler, comprising
    a main body,
    a mounting part provided on an upper portion of the main body and having an inlet for fitting a stock bar into the mounting part,
    a fastening member vertically fastened to an upper portion of the mounting part to fasten the stock bar,
    a U-shaped fitting part provided on a lower portion of the main body so that a locking step of a T-shaped bar is fitted into the fitting part,
    a first screw hole formed in a front surface of the fitting part so that a screw hole fastening member is inserted into the first screw hole to fasten the T-shaped bar located in the U-shaped fitting part,
    the main body having an L-shaped projection at a middle portion of a front thereof, and the L-shaped projection extending away from the main body, thus providing a coupling part to be coupled to a locking step of a C-shaped bar, and
    a second screw hole located under the first screw hole to fasten the screw hole fastening member to a cross bar extending between two T-shaped bars.

\* \* \* \* \*